United States Patent
McCarthy

(10) Patent No.: US 12,240,994 B2
(45) Date of Patent: Mar. 4, 2025

(54) LOW ENVIRONMENTAL IMPACT, NON-FLAMMABLE AEROSOL COATINGS

(71) Applicant: SWIMC LLC, Cleveland, OH (US)

(72) Inventor: Joseph F. McCarthy, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 205 days.

(21) Appl. No.: 17/762,188

(22) PCT Filed: Sep. 23, 2020

(86) PCT No.: PCT/US2020/052240
§ 371 (c)(1),
(2) Date: Mar. 21, 2022

(87) PCT Pub. No.: WO2021/061788
PCT Pub. Date: Apr. 1, 2021

(65) Prior Publication Data
US 2022/0340762 A1    Oct. 27, 2022

Related U.S. Application Data

(60) Provisional application No. 62/706,514, filed on Aug. 21, 2020, provisional application No. 62/904,085, filed on Sep. 23, 2019.

(51) Int. Cl.
*C09D 5/02* (2006.01)
*B05D 1/02* (2006.01)
(Continued)

(52) U.S. Cl.
CPC .............. *C09D 5/021* (2013.01); *B05D 1/02* (2013.01); *C09D 7/20* (2018.01); *C09D 133/10* (2013.01); *C09D 167/08* (2013.01)

(58) Field of Classification Search
CPC ..................................................... C09D 5/021
See application file for complete search history.

(56) References Cited

U.S. PATENT DOCUMENTS

2017/0101609 A1* 4/2017 Vargas ..................... C09K 3/30
2018/0105667 A1* 4/2018 Igualada ............... C08J 9/0066
2019/0100639 A1* 4/2019 Wysong ................ C08J 9/0042

FOREIGN PATENT DOCUMENTS

WO        2011038081         3/2011
WO    WO-2011031697 A2 *    3/2011    ......... B01D 11/0203
(Continued)

OTHER PUBLICATIONS

Honeywell International Inc., "Honeywell Solstice® 1233zd(E): Technical Information", printed Nov. 2013.

*Primary Examiner* — Michael F Pepitone
(74) *Attorney, Agent, or Firm* — Hahn Loeser & Parks LLP; John J. Cunniff

(57) ABSTRACT

An aerosol coating composition contains at least one film-forming resin, trans-1-chloro-3,3,3-trifluoropropene and at least one propellant such as $CO_2$. The aerosol coating composition is non-flammable and compatible with polyethylene terephthalate. The film-forming resin may be acrylic resins, alkyd resins or mixtures thereof. A glycol ether solvent may be present. The coating composition may have low toxicity, be non-ozone depleting, have low or no VOC, be low in maximum incremental reactivity and/or be low in global warming potential. A method of coating a substrate with the aerosol coating composition comprises providing at least one film-forming resin selected from the group consisting of acrylic resins, alkyd resins, and mixtures thereof and trans-1-chloro-trifluoropropene in a container comprising polyethylene terephthalate, which is charged with a propellant comprising carbon dioxide. The aerosol (Continued)

coating composition is non-flammable. The composition is applied to a substrate and allowed to dry.

25 Claims, 1 Drawing Sheet

(51) Int. Cl.
*C09D 7/20* (2018.01)
*C09D 133/10* (2006.01)
*C09D 167/08* (2006.01)

(56) References Cited

FOREIGN PATENT DOCUMENTS

| WO | WO-2011038081 A1 * | 3/2011 | .............. C08J 9/127 |
| WO | 2013028943 | 2/2013 | |
| WO | 2016011219 | 1/2016 | |
| WO | WO-2016011219 A1 * | 1/2016 | ............ C08J 9/0023 |

\* cited by examiner

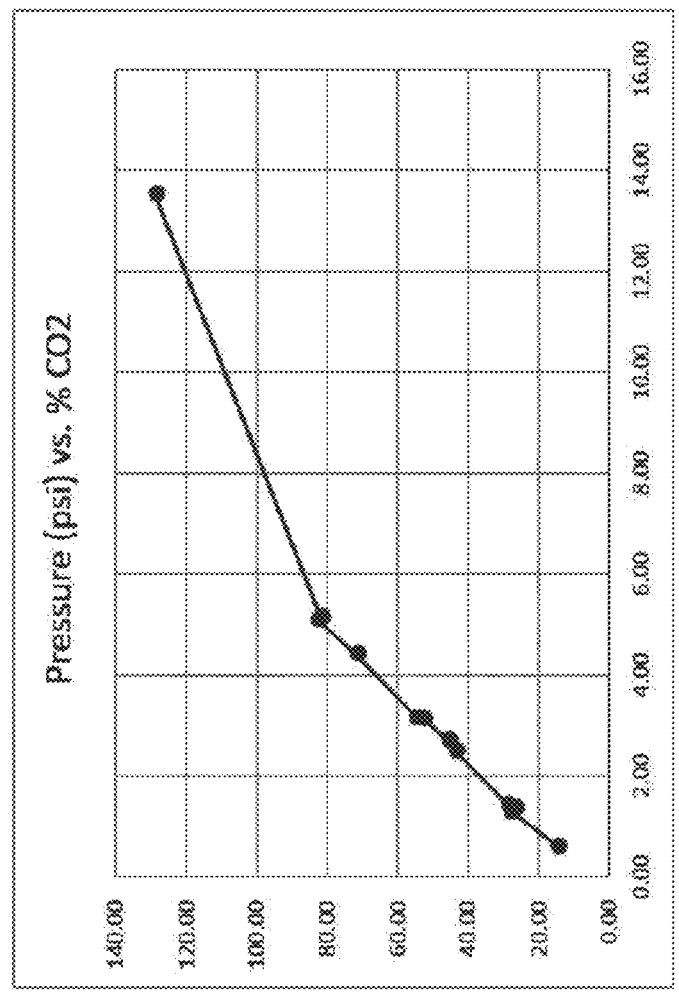
| %CO2 | psi |
|---|---|
| 0.62 | 15.00 |
| 1.31 | 28.00 |
| 1.31 | 28.00 |
| 1.40 | 27.00 |
| 1.44 | 29.00 |
| 2.52 | 44.00 |
| 2.72 | 46.00 |
| 3.14 | 53.00 |
| 3.18 | 55.00 |
| 4.43 | 72.00 |
| 5.11 | 83.00 |
| 5.15 | 82.00 |
| 13.54 | 129.00 |

LOW ENVIRONMENTAL IMPACT, NON-FLAMMABLE AEROSOL COATINGS

CROSS REFERENCE TO RELATED APPLICATIONS

This application claims benefit of U.S. Provisional Application No. 62/904,085 filed on Sep. 23, 2019 and on U.S. Provisional Application No. 62/706,514 filed on Aug. 21, 2020, the contents of both of which are incorporated by reference herein.

BACKGROUND OF THE INVENTION

The invention relates to aerosol coatings, particularly to an aerosol paint product. More particularly, this invention relates to non-flammable aerosol paints. Even more particularly, this invention relates to non-flammable aerosol paints that are also low in environmental impact.

Aerosol paints are frequently used by consumers in applications requiring a relatively small amount of coating. Aerosols provide a convenient application method but often possess certain unfavorable qualities. For example, aerosol delivery systems may rely on flammable solvents, requiring use in a well-ventilated environment. There are solvents that are recognized as non-flammable, such as trichloroethylene, but most, if not all have toxicity or other issues preventing their use.

Other aerosol delivery systems may utilize components that carry environmental concerns with their use. For example, volatile organic compounds (VOCs) are organic compounds that evaporate easily. Some VOCs can provide a number of serious negative effects. VOCs such as methylene chloride and benzene can be harmful to human and animal health, such as by contributing to cancer cell growth. In an indoor environment, the "outgassing" of VOCs contained in plastics or released by office equipment or faulty heating and cooling systems may contribute to health effects generally known as "sick building syndrome." Health effects of VOCs can vary widely. Outdoors, VOCs can react with other gases in sunlight to create smog. Therefore, the use of VOCs in coating formulations is disfavored.

Maximum incremental reactivity (MIR) is another measure of a compound's environmental impact, namely, the ability to form ground level ozone. Other environmental concerns for aerosol coating delivery systems include components that may be classified as ozone-depleting or may have a high global warming potential.

Prior solvent systems for coating formulations failed one or more of the above properties. For example, methylene chloride (MCl) was previously used in in high volumes in the aerosol paint industry—often in place of the current, highest use, aerosol coatings solvent, acetone. Compared to acetone, MCl has higher solvent strength, lower blush potential (non-hydroscopic), higher density, and faster dry. In many respects, it was the ideal solvent for aerosol coatings. However, toxicity and increased risk for several types of cancers led to use of MCl being banned. Trichloroethylene and Tetrachloroethylene (Perchloroethylene), which are very similar to MCl, both have been used widely in the past, but continue to be phased out or banned due to carcinogenic properties. Other solvents which have been banned or disfavored for use due to health risks include trichloroethylene, perchloroethylene (also known as tetrachloroethylene) and trichloroethylene.

Though very low in ozone depletion potential, the use of certain hydrofluorocarbons (HFC's) are facing restrictions and bans based on their high global warming potential. This group includes Freon 113, Freon 11, Freon 22, CFC-12, HFC-23, HFC-125, R-134a, HFC-143a, HFC-4310, R407C, HFC507A, and R404A. Hydrochlorofluorocarbons (HCFCs), while less ozone-depleting than chlorofluorocarbons (CFC), are global warming substances with high ozone-depletion potentials (capacities).

Prior hydrofluoroolefins (HFO's) have typically been considered unsuitable for coatings formulations, usually for low strength (9-10 Kauri Butanol (KB) rating), even though the materials in this group are usually low in toxicity and environmental impact.

Many inert gases, such as nitrogen, are non-flammable but have limited use in aerosols. Fully charged, the atomization of aerosol coatings is possible, but only for a short period of time, after which atomization is lost. Furthermore, in order for aerosols to spray with a constant pressure throughout their service life, the propellants used must be compatible with the formula into which it is dissolved. Ideal gases, such as nitrogen or helium, lack any measurable solubility in coatings mixtures, making them non-viable as propellants. Non-ideal gases, however, such as carbon dioxide ($CO_2$) and nitrous oxide ($N_2O$), have limited levels of solubility in water, but much higher solubility in select, organic solvents. For $N_2O$, its high potential for inhalation abuse rules out its use. $CO_2$ can be utilized as a lone propellant, but generally for products, such as lubricants, insect sprays, and brake cleaner, that work best as a non-atomizing aerosol.

There is a need therefore, for an aerosol coating system that utilizes environmentally friendly components that are non-flammable and low in toxicity, non-ozone depleting, having low or zero VOC, low in maximum incremental reactivity (MIR), low in global warming potential (GWP), or a combination of these properties.

Another potential problem associated with the use of aerosol paints is color variation. While non-aerosol paints can be readily observed by the consumer, aerosol paints do not provide such an opportunity other than from actual test dispensing of the coating, causing waste. Aerosol paints are typically packaged in tin-plated or epoxy-coated steel. While polyethylene terephthalate (PET) has been proposed as a container for aerosol paints, formulations for such a packaging would require compatibility with such a plastic resin.

Prior formulations fail to provide compatibility with resins such as PET. For example, water-based-coating formulations might be considered for plastic-compatible formulations. Such a formulation might rely on dimethyl ether (DME), a water-compatible propellant, which is soluble in water to 47.1 percent by weight. However, DME is highly flammable and has a solvent strength of 60 Kauri Butanol (KB), which is high enough to damage PET. DME is also higher in cost than typical hydrocarbon propellants and must be used at higher concentrations to achieve full atomization of the coating formulation. Water-based formulations also are frequently poor in shelf-life, particularly with repeated freeze/thaw cycles.

Therefore, there is also a need for an aerosol coating composition that can be packaged in a clear plastic container, allowing the consumer to observe the actual color of that composition while still in the container.

BRIEF SUMMARY OF INVENTION

It is, therefore, an aspect of the present invention to provide an aerosol coating system that utilizes environmentally friendly components that are non-flammable and low in toxicity, are non-ozone depleting, have low or zero VOC, are low in MIR, are low in global warming potential (GWP), or have a combination of any of these properties.

It is another aspect of the present invention to provide an aerosol coating system that is compatible with clear plastic packaging, allowing the consumer to directly observe the precise color of the coating contained therein.

It is still another aspect of the present invention to provide an aerosol coating system that is superior to current commercial products in non-flammability and safety of use.

The present invention also provides an aerosol coating system that has greatly reduced odor, toxicity, global warming potential, MIR, and VOC. In this regard, the present invention allows for use in more restrictive environments than previous aerosol coating systems such as schools, hospitals or work-places with restrictive occupational safety guidelines in place.

It is yet another aspect of the present invention to provide an aerosol coating system that produces a coating that is equal or superior to current commercial products in providing a high gloss film having high flexibility and durability.

In general, the present invention provides an aerosol coating system that utilizes environmentally friendly components. It has been found that a blowing agent previously used for polymer foams, trans-1-chloro-3,3,3-trifluoropropene, may be used as a solvent/propellant in an aerosol paint composition without causing foaming. The solvent is non-flammable, VOC exempt, has a very low (<1) global warming potential, and has a high occupational exposure limit (OEL of 800 PPM). The solvent has a higher solvent strength (KB, or Kauri-Butanol) rating than comparable fluorinated solvents, 25. For example, trans 1-3,3,3-tetrafluoro-1-propene has a KB of 9. The use of trans-1-chloro-3,3,3-trifluoropropene in coating compositions is compatible with polyethylene terephthalate containers which are visually transparent, allowing the color of the coating composition to be observed while still in the container.

Surprisingly, trans-1-chloro-3,3,3-trifluoropropene can be mixed together with other propellants without resulting in a flammable final product. For example, one mixture, a blend of 18% propane and 82% trans-1-chloro-3,3,3-trifluoropropene, sprayed directly onto a candle flame (previous standard flame extension test), repeatedly extinguished the flame—showing no signs of flame extension. In particular, trans-1-chloro-3,3,3-trifluoropropene may be combined with an accompanying propellant gas, such as carbon dioxide ($CO_2$) or other non-flammable propellant to result in a non-flammable aerosol coating composition.

BRIEF DESCRIPTION OF THE DRAWING

FIG. 1 is a graph showing the resulting pressure in pounds per square inch (psi) versus percentage of carbon dioxide ($CO_2$) for propellant compositions containing trans-1-chloro-3,3,3-trifluoropropene and $CO_2$.

DETAILED DESCRIPTION OF THE INVENTION

The present invention is directed toward an aerosol coating system that utilizes environmentally friendly components that are non-flammable and low in toxicity, are non-ozone depleting, have low or zero VOC, are low in MIR, are low in global warming potential, or have a combination of any of these properties. The following examples should not be viewed as limiting the scope of the invention. The claims will serve to define the inventions.

The invention provides an aerosol coating composition comprising at least one film-forming resin selected from the group consisting of acrylic resins and alkyd resins, trans-1-chloro-3,3,3-trifluoropropene and at least one propellant. The aerosol coating composition is non-flammable and compatible with polyethylene terephthalate.

In certain embodiments, the film-forming resin may consist of an alkyd resin or it may consist of an acrylic resin. In other embodiments, the film forming components may comprise a combination of at least one alkyd resin and at least one acrylic resin. In certain embodiments, the ratio of alkyd resin to acrylic resin may be 1:1 or less. In certain embodiments, the ratio of alkyd resin to acrylic resin may be 0.8 or less, 0.7 or less, 0.6 or less, 0.5 or less, 0.4 or less, 0.3 or less, 0.2 or less or 0.1 or less. Alkyd resins that may be used include Perstorp Boltorn U3000, a dendritic (spherically shaped), low viscosity, ~100 percent solids long oil alkyd. (Perstorp, Sweden) Other suitable alkyds include other non-dendritic, ~100 percent solids, long oil alkyds, such as EPS 6677 (Engineered Polymer Solutions, Marengo, Illinois, US). Dianal MB-7022, is one example of a (very) low molecular weight (20K), thermoplastic film forming acrylate polymer, polyisobutyl methacrylate (IBMA). Other potential acrylate resins include n-butyl methacrylates and blends a copolymers thereof.

The invention comprises trans-1-chloro-3,3,3-trifluoropropene. Commercially available examples of trans-1-chloro-3,3,3-trifluoropropene include Solstice® PF-C and Solstice® Liquid Blowing Agent (LBA) (Honeywell International, Morris Plains, NJ). These products are indicated to have a global warming potential of 1, no flash pint by ASTM D3828-97 and ASTM D 1310-86, and an ozone depleting potential of ~0. Because this compound has a high vapor pressure (108.3 kPa at 20° C.), it functions as both a solvent for the resin and as a propellant. Additional solvents and propellants may be present. In certain embodiments, the solvents present are classified as non-flammable. In 2012, the former test for aerosol flammability, ASTM D 3065 "Flame Extension," was replaced with the United Nations GHS (Global Harmonization Systems) 2012 program, which includes an "Enclosed Space (drum) Test" and a rigorous "Ignition Distance Test". Solvent based aerosol coatings, even those that are 100% free of flammable solvents and propellants, frequently fail this test, as the very intense blue flame which it is sprayed through will cause ingredients, such as polymers, plasticizers, and organic pigments, to ignite. In these cases, ignition of these materials may only cause a sparking-like appearance in the test flame, but such results are frequently interpreted as failures. However, included in the same document, the 3rd Revised Edition of the UN GHS 2012, which became effective on May 25, 2012, the GHS test protocol is not required for Class 3 Aerosols, which are defined as aerosol formulas that contains less than 1% of materials that are classified by GHS as flammable, i.e., those materials with flash points below 93 C/200 F and have an indexed heat of combustion under 20 kJ/g. In the invention, the composition may contain less than 1 percent solvents classified by the United Nations GHS (Global Harmonization Systems) 2012 program as flammable (GHS-flammable solvents). In certain embodiments, the composition comprises less than 0.75 percent, 0.5 percent, 0.25 percent or even 0.1 percent solvents classified under the GHS as flammable (GHS flammable solvents). In certain particular embodiments, the composition contains less than 0.05 percent GHS flammable solvents, such as less than 0.04 percent, less than 0.03 percent, less than 0.02 percent or even 0.01 percent or less GHS flammable solvents.

Solvents may further include triethyl phosphate and various ethers such as glycol ethers. In some embodiments, the glycol ether solvent may be and alkyl or aromatic glycol ether such as diethylene glycol monomethyl ether, dipropylene glycol monobutyl ether, propylene glycol phenyl ether, dipropylene glycol n-butyl ether, or dipropylene glycol n-propyl ether. Glycol ether solvents that may be used also include propylene glycol monomethyl ether, propylene glycol t-butyl ether, ethylene glycol monoethyl ether, propylene glycol n-propyl ether, propylene glycol monomethyl ether, propylene glycol monoethyl ether, ethylene glycol monobutyl ether, dipropylene glycol monomethyl ether, ethylene glycol n-hexyl ether, and tripropylene glycol methyl ether.

Low levels of mineral spirits or other aliphatic petroleum distillates may be present in some formulations, provided that the composition remains non-flammable. In such embodiments, drying agents such as cobalt-based, manganese-based, or zirconium-based drying agents or the like may be used. It is envisioned that solvents such as hexane, heptane, methylcyclohexane, cyclohexane, 2-2-dichloropropane and diethylene glycol would not be usable in concentrations over 1 percent due to their flammability.

In some embodiments, the aerosol coating composition may be devoid of solvents which are flammable or hazardous. These include aromatic solvents such as benzene, toluene, xylene, ethyl benzene, and naphtha, carbonate solvents such as propylene carbonate, ethylene carbonate, dimethyl carbonate, ethyl methylcarbonate and diethyl carbonate, ester solvents such as methyl acetate, n-butyl acetate, ethyl acetate, n-propyl acetate, amyl acetate, ethyl ethoxy proprionate, ethyl hexyl acetate, triacetin, isobutyl isobutyrate and dibasic ester, ketone solvents such as acetone, methyl ethyl ketone (MEK), methyl propyl ketone (MPK), methyl isobutyl ketone (MIBK), methyl isoamyl ketone (MIAK), cyclohexanone, methyl amyl ketone (MAK), disobutyl ketone (DIBK), C-11 ketone, and acetophenone, glycol ether acetate solvents, halogenated solvents, and terpene solvents.

Pigments may also be used as they commonly are in the coatings industry, at a level appropriate for the desired color of the final product. Example include carbon black, titanium dioxide, JHR1703L, Pigment Red 170 (Napthol Red), (Shanghai JECO Group Ltd., Shanghai, China), 2300, Pigment White 6 (TiO$_2$, Kronos Worldwide, Dallas, TX, USA), Heliogen L 6700 F, Pigment Blue 15:6 (Phthalocyanine Blue, BASF Ludwigshafen, Germany), Raven 850, Pigment Black 7, (Aditya Birla, Worli, Mumbai, India), Lysopac 6616B, Pigment Yellow 184, (Cappelle Pigments, Menen, Belgium) Pantint 12G1740P, Pigment Green 36 (chip dispersion, PAN Technologies, Carlstadt, NJ), BF Micro, BF Micro Plus, and similar pigments.

The invention will be better understood by reference to the following examples which are included for the purpose of illustration and not limitation.

A white aerosol coating composition was created with the following components:
  5.5 weight percent isobutyl methacrylate resin,
  4.6 weight percent aliphatic petroleum distillate solvent (140 Flash),
  1.4 weight percent styrene-derived hydrocarbon resin (Piccolastic A5),
  Mixed until dissolved and the added:
  0.1 weight percent Suspeno 201-MS 20 leveling agent,
  0.3 weight percent Nuosperse 657 (wetting and dispersing solvent),
  3.1 weight percent titanium dioxide,
  80.6 weight percent trans-1-Chloro-3,3,3-trifluoropropene
  0.7 weight percent Propylene Glycol Phenyl Ether,
  3.8 weigh percent $CO_2$
  (weight percentages approximate; +/−0.04 percent)

The composition provides a show-quality coating with no visible flaws.

In another example, a high-quality white coating was made:
  2.5 weight percent n-butyl methacrylate resin (Elvacite 4345)
  5 percent odorless mineral spirits
  2.5 weight percent Dipropylene Glycol n-Butyl Ether (DPnB)
  0.1 weight percent Suspeno 201-MS 20 leveling agent
  0.1 weight percent Nuosperse 657 wetting and dispersing agent
  2.3 weight percent Titanium dioxide
  83.2 weight percent trans-1-Chloro-3,3,3-trifluoropropene
  4.4 weight percent $CO_2$
  (weight percentages approximate; +/−0.04 percent)

Another coating combines 2 low-odor Glycol Ether tail solvents, Diethylene Glycol Monomethyl Ether and Dipropylene Glycol Monobutyl Ether, with a high molecular weight (for durability) butyl methacrylate acrylic resin (for flexibility, toughness), TiO$_2$ pigment, and the additives, Nuosperse 657 and Suspeno 201-MS, to make a viscous (to minimize flammable solvent content) paint concentrate. To 13 parts of this concentrate, 87.5 parts of trans-1-Chloro-3,3,3-trifluoropropene are added, cans are crimped, and 4.5 parts of $CO_2$ are added through the valve. Coatings were successfully made from this composition.

As stated above, trans-1-Chloro-3,3,3-trifluoropropene functions as both a solvent for the resin and as a propellant. Trans-1-Chloro-3,3,3-trifluoropropene may be combined with other propellant gases to provide an aerosol coating composition. Trans-1-Chloro-3,3,3-trifluoropropene is approximately 4 times as volatile as acetone (108.3 kPa vs. 25.0 kPa (@ 20° C.), a solvent which is already recognized as being one of the fastest evaporating (and most common) solvents used in aerosol coatings. It has been discovered that its vapor pressure (15 psi) may be augmented with the addition of accompanying propellants to provide a vapor pressure sufficient to be used as a propellant for a coating composition. In one particular example, a pressure in the range of 70-85 psig is provided. As shown in FIG. 1, levels as high as 13.5% $CO_2$ have been successfully dissolved into trans-1-chloro-3,3,3-trifluoropropene. In some examples, such as those in which it is desired to minimize over spray during indoor application, the $CO_2$ concentration to be used may be in a lower range, such as 3% $CO_2$ (50 psig), 4% $CO_2$ (65 psig), or 5% $CO_2$ (80 psig). In one example, a resulting psi of 60 to 65 psig may be used.

It is envisioned that trans-1-chloro-3,3,3-trifluoropropene may be added in the form of a blended propellant, with 2-5% $CO_2$. This will provide greater accuracy than attempting to add $CO_2$ to aerosol. By pre-blending $CO_2$ with trans-1-chloro-3,3,3-trifluoropropene, that error is decreased to within the very accurate capabilities of commercial propellant blend suppliers.

With aerosol coatings packaged in steel cans, material loss is limited to components (propellants & some solvents) that are able to escape through valve gaskets. To account for loss of product through aerosol valves, aerosol coatings manufacturers may include an overfill on their aerosol products. With aerosols packaged in plastic, however, there is an added possibility of the same materials escaping (permeating) through the container walls. Polyethylene and polypropylene, for example, have excellent chemical resistance, but are relatively permeable compared to plastics such as polyamide, polyvinylidene dichloride, and ethylene vinyl alcohol. PET is rated as having good barrier properties. The net content of several formulas, packaged in CKS Petaloid containers, were measured over several months and exhibited loss rates comparable to loss rates for steel aerosol cans. In another example, a combination of trans-1-Chloro-3,3,3-trifluoropropene and 5% $CO_2$ was package in a PET container. No loss of container clarity or expansion with oven storage was observed.

Compositions according to the invention may have less than 1 percent of materials that are classified as flammable, have flash points below 93° C. (200° F.) and/or an indexed heat of combustion under 20 kJ/g. As mentioned above, such compositions are exempt from flammability tests under the $3^{rd}$ revision of the United Nations GHS (Global Harmonization Systems) 2012 program, which became effective on May 25, 2012. Examples of such compositions are provided in Tables 1 and 2 below.

TABLE 1

Acrylic Formulation

|  | % | kJ/g | % GHS Flam |
|---|---|---|---|
| Trans-1-Chloro-3,3,3-trifluoropropene | 86.57 | 9.08 | 0% |
| Triethyl Phosphate | 3.72 | 38.48 | 0% |
| Acrylic Resin (Dianal MB-7022) | 5.53 | 25.10 | 0% |
| Ethylhexyl Diphenyl Phosphate | 0.58 | 33.09 | 0% |
| $CO_2$ | 3.61 | 8.94 | 0% |
|  | 100.00 | 11.19 | 0.00% |

TABLE 2

Alkyd Formulation

|  | % | kJ/g | % GHS Flam |
|---|---|---|---|
| Trans-1-Chloro-3,3,3-trifluoropropene | 86.84 | 9.08 | 0% |
| Triethyl Phosphate | 0.40 | 38.48 | 0% |
| Alkyd resin | 8.98 | 30.00 | 0% |
| Cobalt Drier (Min Sp) | 0.05 | 45.00 | 88% |
| Zirconium Drier (Min Sp) | 0.09 | 45.00 | 76% |
| MEKO | 0.02 | 42.73 | 100% |
| $CO_2$ | 3.62 | 8.94 | 0% |
|  | 100.00 | 11.13 | 0.06% |

The acrylic formulation of Table 1 is based on Dianal MB-7022, a (very) low (20K) molecular weight, thermoplastic film forming polymer, polyisobutyl methacrylate (IBMA). Advantages of this formulation strategy include water white clarity, <60 minute dry to touch, high sag resistance, no possibility of a recoat, good exterior durability, and, of particular importance, when packaged in PET plastic, a very strong visual appeal.

Pigmented coating compositions according to the present invention were also produced. A red coating containing a mixture of acrylic and alkyd resins (1.5:1) was produced having the composition provided in Table 3. A stock solution containing 60 weight percent Paraloid B-67 (IBMA) and 40 weight percent dipropylene glycol n-butyl ether (DPnB) was utilized to provide those components to the composition. Dipropylene glycol n-propyl ether (DPnP) may also be used in place of, or in addition to DPnB.

TABLE 3

| Amt (g) | Component | % |
|---|---|---|
| 14.20 | Red 170 | 1.79 |
| 17.50 | Paraloid B-67 | 2.21 |
| 26.25 | DPnB | 3.32 |
| 22.5 | EPS 6677 | 2.84 |
| 0.06 | MEKO | 0.01 |
| 17.50 | Paraloid B-67 | 2.21 |
| 26.25 | DPnB | 3.32 |
| 0.13 | 12% Cobalt Cem All | 0.02 |
| 0.09 | 10% Calcium | 0.01 |
| 0.16 | 24% Zirconium | 0.02 |
| 650.00 | Trans-1-Chloro-3,3,3-trifluoropropene | 82.17 |
| 16.67 | $CO_2$ | 2.11 |
| 791.04 |  | 100.00 |

The composition contained 0.04% GHS-flammable solvent and when applied to a substrate by spraying, provided a film with an excellent appearance.

A similar red composition containing 0.18 alkyd to acrylic resin was also produced with the components provided in Table 4. A stock solution containing Paraloid B-67 (IBMA) and dipropylene glycol n-butyl ether (DPnB) was again utilized to mix components listed. Dipropylene glycol n-propyl ether (DPnP) may also be used in place of, or in addition to DPnB.

TABLE 4

| Amt (g) | Component | % |
|---|---|---|
| 14.20 | Red 170 | 1.80 |
| 17.50 | Paraloid B-67 | 2.21 |
| 26.25 | DPnB | 3.32 |
| 7.50 | EPS 6677 | 0.95 |
| 0.06 | MEKO | 0.01 |
| 23.50 | Paraloid B-67 | 2.97 |
| 35.25 | DPnB | 4.46 |
| 0.04 | 12% Cobalt Cem All | 0.01 |
| 0.02 | 10% Calcium | 0.00 |
| 0.05 | 24% Zirconium | 0.01 |
| 650.00 | Trans-1-Chloro-3,3,3-trifluoropropene | 82.17 |
| 16.67 | $CO_2$ | 2.11 |
| 791.04 |  | 100.00 |

The composition contained 0.01% GHS-flammable solvent and the film provided by the composition was acceptable in appearance.

A white composition containing 0.78 alkyd to acrylic resin was formulated as shown in Table 5.

TABLE 5

| Amt (g) | Component | % |
|---|---|---|
| 6.78 | $TiO_2$ | 2.33 |
| 6.03 | Paraloid B-67 | 2.08 |
| 9.05 | DPnP | 3.12 |

TABLE 5-continued

| Amt (g) | Component | % |
|---|---|---|
| 7.76 | EPS 6677 | 2.67 |
| 0.02 | MEKO | 0.01 |
| 5.29 | Paraloid B-67 | 1.82 |
| 7.93 | DPnP | 2.73 |
| 0.08 | Borchi Dragon | 0.03 |
| 241.38 | Trans-1-Chloro-3,3,3-trifluoropropene | 83.09 |
| 6.19 | $CO_2$ | 2.13 |
| 290.51 | | 100.00 |

The resulting composition contained 0.02% GHS-flammable solvents with low odor. The composition was applied to a substrate by spraying and the resulting film was excellent in appearance and durable.

A further white composition containing 0.19 alkyd to acrylic resin was formulated as shown in Table 6. A stock solution containing Paraloid B-67 (IBMA) and dipropylene glycol n-butyl ether (DPnB) was again utilized to mix components listed. Dipropylene glycol n-propyl ether (DPnP) may also be used in place of, or in addition to DPnB.

TABLE 6

| Amt (g) | Description | % |
|---|---|---|
| 19.66 | $TiO_2$ | 2.49 |
| 17.50 | Paraloid B-67 | 2.21 |
| 26.25 | DPnB | 3.32 |
| 7.50 | EPS 6677 | 0.95 |
| 0.06 | MEKO | 0.01 |
| 21.34 | Paraloid B-67 | 2.70 |
| 32.01 | DPnB | 4.05 |
| 0.07 | Borchi Dragon | 0.01 |
| 0.00 | 10% Calcium | 0.00 |
| 0.00 | 24% Zirconium | 0.00 |
| 650.00 | Trans-1-Chloro-3,3,3-trifluoropropene | 82.17 |
| 16.67 | $CO_2$ | 2.11 |
| 791.06 | | 100.00 |

The resulting composition contained 0.01% GHS-flammable solvent and when applied to a substrate by spraying the resulting film provided a good initial appearance.

A coating composition containing acrylic resin only and no alkyd resin was formulated as provided in Table 7.

TABLE 7

| Amt (g) | Component | % |
|---|---|---|
| 9.91 | $TiO_2$ | 3.41 |
| 8.82 | Paraloid B-67 | 3.03 |
| 13.22 | DPnP | 4.55 |
| 7.73 | Paraloid B-67 | 2.66 |
| 11.59 | DPnP | 3.99 |
| 233.26 | Trans-1-chloro-3,3,3-trifluoropropene | 80.29 |
| 5.98 | $CO_2$ | 2.06 |
| 290.51 | | 100.00 |

The formulation contained 0.0% GHS-flammable solvent and the resulting film after application to a substrate by spraying, had a good initial appearance.

Black compositions according to the present invention were also formulated. The components of one such composition, containing a 1.5:1 acrylic resin to alkyd resin ratio, are provided in Table 8. A stock solution containing Paraloid B-67 (IBMA) and dipropylene glycol n-butyl ether (DPnB) was again utilized to mix components listed. Dipropylene glycol n-propyl ether (DPnP) may also be used in place of, or in addition to DPnB.

TABLE 8

| Amt (g) | Component | % |
|---|---|---|
| 1.49 | Black | 0.51 |
| 6.53 | Paraloid B-67 | 2.25 |
| 9.79 | DPnB | 3.37 |
| 7.46 | EPS 6677 | 2.57 |
| 0.07 | MEKO | 0.03 |
| 6.53 | Paraloid B-67 | 2.25 |
| 9.79 | DPnB | 3.37 |
| 0.07 | Borchi Dragon | 0.03 |
| 0.00 | 10% Calcium | 0.00 |
| 0.00 | 24% Zirconium | 0.00 |
| 242.54 | Trans-1-chloro-3,3,3-trifluoropropene | 83.49 |
| 6.22 | $CO_2$ | 2.14 |
| 290.51 | | 100.00 |

The composition contained 0.02% GHS-flammable solvent and the resulting coating was excellent in appearance after application to a substrate by spraying.

An additional black coating composition having an alkyd to acrylic ratio of 0.17 was produced with the components listed in Table 9. A stock solution containing Paraloid B-67 (IBMA) and dipropylene glycol n-butyl ether (DPnB) was again utilized to mix components listed. Dipropylene glycol n-propyl ether (DPnP) could also be used.

TABLE 9

| Amt (g) | Component | % |
|---|---|---|
| 4.00 | Black | 0.51 |
| 17.50 | Paraloid B-67 | 2.21 |
| 26.25 | DPnB | 3.32 |
| 7.50 | EPS 6677 | 0.95 |
| 0.06 | MEKO | 0.01 |
| 27.58 | Paraloid B-67 | 3.49 |
| 41.37 | DPnB | 5.23 |
| 0.07 | Borchi Dragon | 0.01 |
| 0.00 | 10% Calcium | 0.00 |
| 0.00 | 24% Zirconium | 0.00 |
| 650.00 | Trans-1-chloro-3,3,3-trifluoropropene | 82.17 |
| 16.67 | $CO_2$ | 2.11 |
| 791.00 | | 100.00 |

The composition contained 0.01% GHS-flammable solvent and the resulting coating after spraying onto a substrate exhibited some printability but provided a good coating with an overnight dry.

A further black coating composition was produced containing only acrylic resin and no alkyd resin was produced with the components listed in Table 10. A stock solution containing Paraloid B-67 (IBMA) and dipropylene glycol n-butyl ether (DPnB) was again utilized to mix components listed. Dipropylene glycol n-propyl ether (DPnP) could also be used.

TABLE 10

| Amt (g) | Composition | % |
|---|---|---|
| 1.93 | Black | 0.66 |
| 8.45 | Paraloid B-67 | 2.91 |
| 12.68 | DPnB | 4.36 |
|  | disperse to 7H |  |
| 10.40 | Paraloid B-67 | 3.58 |
| 15.61 | DPnB | 5.37 |
| 235.48 | Trans-l-Chloro-3,3,3-trifluoropropene | 81.03 |
| 6.04 | $CO_2$ | 2.08 |
| 290.59 |  | 100.00 |

The composition contained 0.0% GHS-flammable solvent.

It should be evident that the present invention is highly effective in providing a non-flammable aerosol paint that also has a low impact on the environment. It should be understood that any variations evident fall within the scope of the claimed invention and thus, the selection of specific component elements can be determined without departing from the spirit of the invention herein disclosed and described.

Glossary of Components

MB 7022: Isobutyl methacrylate resin.
140 Flash aliphatic: aliphatic petroleum distillate solvent.
Piccolastic A5: styrene-derived hydrocarbon resin (Eastman Chemical Co., Kingsport Tennessee).
Suspeno 201-MS 20: leveling agent.
Nuo 657: Nuosperse 657, wetting and dispersing solvent
TI Pure R-960: titanium dioxide
PPH: Propylene Glycol Phenyl Ether
Elvacite® 2044: n-butyl methacrylate resin (Lucite International Inc., Cordova, TN, US)
Elvacite® 4345: n-butyl methacrylate resin with anti-caking agent. (Lucite International Inc., Cordova, TN, US)
Methyl Carbitol: 2-(2-Methoxyethoxy)ethanol.
Kronos 2300 $TiO_2$: Titanium dioxide
DPnB: Dipropylene Glycol n-Butyl Ether
DPnP: Dipropylene Glycol n-Propyl Ether
Paraloid B-67: isobutyl methacrylate (IBMA) resin, MW 60,000. (Dow Inc., Midland MI)
MEKO: methyl ethyl ketoxime
EPS 6677: ~100 percent solids long oil alkyd (Engineered Polymer Solutions, Marengo, Illinois, US)
Borchi® Dragon: Cobalt-free metal ligand catalyst drying agent (Borchers, Westlake, Ohio, US)
Red 170: (Napthol Red), (Shanghai JECO Group Ltd., Shanghai, China)

What is claimed is:

1. An aerosol coating composition comprising:
at least one film-forming resin selected from the group consisting of acrylic resins, alkyd resins, and mixtures thereof;
trans-1-chloro-3,3,3-trifluoropropene; and
at least one propellant, wherein the propellant comprises carbon dioxide;
wherein the aerosol coating composition comprises less than 1 percent GHS-flammable solvents;
and further wherein the aerosol coating composition forms a film without foam formation upon dispensing.

2. The aerosol coating composition of claim 1, wherein the aerosol coating composition comprises less than 0.5 percent GHS-flammable solvents.

3. The aerosol coating composition of claim 1, wherein the at least one film forming resin comprises an acrylic resin.

4. The aerosol coating composition of claim 1, wherein the at least one film forming resin consists of an acrylic resin.

5. The aerosol coating composition of claim 1, wherein the propellant consists of carbon dioxide.

6. The aerosol coating composition of claim 3, wherein the at least one film forming resin additionally comprises an alkyd resin.

7. The aerosol coating composition of claim 1, wherein the at least one film forming resin comprises an alkyd resin.

8. The aerosol coating composition of claim 7, additionally comprising a glycol ether solvent.

9. The aerosol coating composition of claim 8, wherein the glycol ether is selected from the group consisting of alkyl glycol ethers and aromatic glycol ethers.

10. The aerosol coating composition of claim 8, wherein the glycol ether is selected from the group consisting of diethylene glycol monomethyl ether, dipropylene glycol monobutyl ether, propylene glycol phenyl ether, dipropylene glycol n-butyl ether, and dipropylene glycol n-propyl ether.

11. The aerosol coating composition of claim 8, wherein the composition is contained in a container comprising polyethylene terephthalate.

12. The aerosol coating composition of claim 10, wherein aerosol coating composition comprises one or more properties selected from the group consisting of having an ozone depleting potential of 0, being free of VOC, having a maximum incremental reactivity of 0.5 or less, and having a global warming potential of less than 1.

13. A method of coating a substrate with a coating composition, the method comprising:
providing an aerosol coating composition, the aerosol coating composition comprising at least one film-forming resin selected from the group consisting of acrylic resins, alkyd resins, and mixtures thereof, and trans-1-chloro-3,3,3-trifluoropropene,
wherein the aerosol coating composition comprises less than 1 percent GHS-flammable solvents, and
wherein the aerosol coating composition is provided in a container comprising polyethylene terephthalate, and
further wherein the container is charged with a propellant comprising carbon dioxide; applying the aerosol coating composition to a substrate, wherein the applied aerosol coating composition does not form a foam;
and allowing the applied aerosol coating composition to dry.

14. The method of claim 13, wherein the aerosol coating composition comprises less than 0.5 percent GHS-flammable solvents.

15. The method of claim 13, wherein the at least one film forming resin comprises an acrylic resin.

16. The method of claim 13, wherein the at least one film forming resin consists of an acrylic resin.

17. The method of claim 13, wherein the propellant consists of carbon dioxide.

18. The method of claim 15, wherein the at least one film forming resin additionally comprises an alkyd resin.

19. The method of claim 13, wherein the at least one film forming resin comprises an alkyd resin.

20. The method of claim 19, wherein the aerosol coating composition additionally comprises a glycol ether.

21. The method of claim 20, wherein the glycol ether is selected from the group consisting of alkyl glycol ethers and aromatic glycol ethers.

22. The method of claim 20, wherein the glycol ether is selected from the group consisting of diethylene glycol monomethyl ether, dipropylene glycol monobutyl ether, propylene glycol phenyl ether, dipropylene glycol n-butyl ether, and dipropylene glycol n-propyl ether.

23. The method of claim 13, wherein the aerosol coating composition comprises one or more properties selected from the group consisting of having an ozone depleting potential of 0, being free of VOC, having a maximum incremental reactivity of 0.5 or less, and having a global warming potential of less than 1.

24. The method of claim 15, wherein the aerosol coating composition additionally comprises a glycol ether.

25. The aerosol coating composition of claim 3, additionally comprising a glycol ether solvent.

\* \* \* \* \*